United States Patent [19]

Heisler

[11] 3,861,840

[45] Jan. 21, 1975

[54] APPARATUS FOR MOLDING A PLASTIC CONTAINER HAVING A MOLDED HANDLE PIVOTALLY RETAINED BY AN INTEGRALLY FORMED ATTACHMENT

[76] Inventor: Raymond A. Heisler, 657 Dakota Tr., Franklin Lakes, N.J. 07417

[22] Filed: Feb. 20, 1973

[21] Appl. No.: 333,500

[52] U.S. Cl. .............. 425/130, 249/58, 425/242 R
[51] Int. Cl. .............................................. B29f 1/00
[58] Field of Search .... 425/117, 356, 130, DIG. 58, 425/468, 257, 441, 436, 242; 249/58; 164/319, 321, 342; 264/328

[56] References Cited
UNITED STATES PATENTS

| | | | |
|---|---|---|---|
| 3,344,848 | 10/1967 | Hall et al. ........................ | 164/319 X |
| 3,387,646 | 6/1968 | Lauth ............................... | 164/319 X |
| 3,570,068 | 3/1971 | Ruggles et al. .................... | 425/117 |
| 3,706,515 | 12/1972 | Keuerleber et al. ............. | 425/257 X |

FOREIGN PATENTS OR APPLICATIONS

| | | | |
|---|---|---|---|
| 1,801,124 | 4/1970 | Germany ........................... | 425/242 |

*Primary Examiner*—R. Spencer Annear
*Assistant Examiner*—Mark Rosenbaum
*Attorney, Agent, or Firm*—Ralph R. Roberts

[57] ABSTRACT

This invention pertains to the apparatus and method of forming a molded container of plastic which as it is molded is formed with a pair of attachments and while the just molded container is still retained in the mold a pair of movable pin portions are moved outwardly to evacuate the molded attachment and uncover and provide access to the just formed attachment. Into these attachments and a connected second mold cavity a different plastic is injected which second cavity, when filled, forms a bail-like handle whose ends flow into and/or around the previously molded attachments formed on the container. The container is shown as molded with three different attachment applications and methods. In a first attachment, the mold is formed with a socket into which the bail end is formed to provide a ball or button-like attachment. In a second embodiment, the container is molded with button-like protuberances and the handle is molded with its ends flowing around these protuberances to provide pivoted mounting of the ends of the handle. In a third embodiment, the attachment on the container is a short pin around which the handle end is formed as a strap-like attachment. When the container and bail are released from the mold the container includes a rotatably retained plastic bail-type handle.

15 Claims, 17 Drawing Figures

APPARATUS FOR MOLDING A PLASTIC CONTAINER HAVING A MOLDED HANDLE PIVOTALLY RETAINED BY AN INTEGRALLY FORMED ATTACHMENT

BACKGROUND OF THE INVENTION

Description of the Prior Art

Molded containers of plastic and having handles attached thereto are, of course, well known and in a great many instances the attached handle is made of wire or other metal. It is known to provide a plastic bail of strap-like configuration which is secured to the container by inserting the ends of the bail into ears or onto protruding buttons formed on the container so as to retain the ends of the handles to the previously molded containers. This means of retaining and mounting a bail requires additional manufacturing operations and in many cases where the bail is of plastic the strength and retention of the bail on the pail is oftentimes unsatisfactory. Where wire bails are used with plastic containers, the ends of the bails and the molded ears or recesses for receiving the ends of the bails usually require elaborate tooling and associated assembly costs.

The present invention pertaining to the apparatus and method of molding a bailed container has the container and the bail handle molded and assembled in the same mold and absent further assembly operations. It is proposed that in a first embodiment the container be formed with a molded outwardly extending retaining rim. As this container is molded a pair of slidable tool portions in the form of pins, when in a first position, form a pair of sockets as the container is molded. The molding is preferably injection molding but may include a blow molded container having formed protuberances to which the handle is attached. In these sockets the ends of the bail and the handle portion therebetween are molded of a different supply of plastic material with the ends of the bail pivotally retained in the sockets. After the handle is molded the bailed plastic container is removed from the mold. In a second arrangement showing the reverse of the preferred assembly, the slidable tool portions are formed with their inner ends having button-like cavities resulting in the molded container having attached button-like protuberances. When and after the slidable tool portions are moved to a second position to uncover these protuberances, the handle is molded with its ends enclosing these button-like protuberances. After the bail is molded this bailed, plastic container is removed from the mold.

In a third arrangement the slidable tool portions form hollow, pin-like extending attachment portions. When and after the slidable tool portions are moved outwardly to their second position to uncover these protuberances, the handle is molded with the ends enclosing these pins with and in a strap-like attachment. After the bail is molded this bailed, plastic container is removed from the mold.

SUMMARY OF THE INVENTION

A mold and method for forming a plastic container preferably includes a container having a rim portion in which is formed opposed attachments in the form of sockets, button-like or pin-like protuberant ends for retaining the ends of a plastic bail. These sockets or protuberant ends are formed by movable mold pins which are in a first position as the container is molded. Without removing the just molded container from the mold the socket or protuberant end forming mold pins are moved outwardly to a second position to open the sockets or uncover the protuberant ends and at the same time uncover a passageway to a bail molding portion of the mold whose ends terminate at and with the formed sockets or in protuberant ends formed on the container. The bail is of a different plastic supply so that as and when molded the bail ends formed and retained in the sockets or on the protuberant ends on the molded container rim do not weld to the pail. These bail ends when solidified are pivotally retained in the sockets or on the protuberant ends extending from the side of the container. The sockets or protuberant end forming pin members preferably have their ends shaped to form more-or-less spherical sockets or alternately the protuberant ends as button-like protuberances or pin-like extensions on the container. These pin members also close the outer end of the bail cavity and when moved outwardly to a third position are disengaged from the bail and may cause like recesses or protuberances to be formed in the outer facing surface of the end of the bail.

In addition to the above summary the following disclosure is detailed to insure adequacy and aid in understanding of the invention. This disclosre, however, is not intended to prejudice that purpose which is to cover each new inventive concept therein no matter how it may later be disguised by variations in form or additions of further improvements. For this reason there has been chosen a specific embodiment of the mold for the plastic container in which a molded bail handle is pivotally retained by an integrally formed socket. In two alternate embodiments, protuberant ends are formed, one being a button-like protuberance formed on the container with mating sockets formed on the ends of the bail handles. In the other alternate embodiment the protuberant ends are pin-like extensions from the container and a strap-like attachment is formed on each end of the bail and around these pin-like extensions. In the following is shown a preferred apparatus and method for molding the container and handle in two steps while retaining the container in the mold. This specific embodiment and two alternates thereof have been chosen for the purposes of illustration and description as shown in the accompanying drawings wherein:

In the following description and in the claims various details will be identified by specific names for convenience; these names, however, are intended to be generic in their application. Corresponding reference characters refer to like members throughout the seven figures of the drawings.

The drawings accompanying and forming part of, this specification disclose pertinent details of construction for the purpose of explanation of the invention, but it should be understood that structural details may be modified and that the invention may be incorporated in other structural forms than shown.

Figure 1:
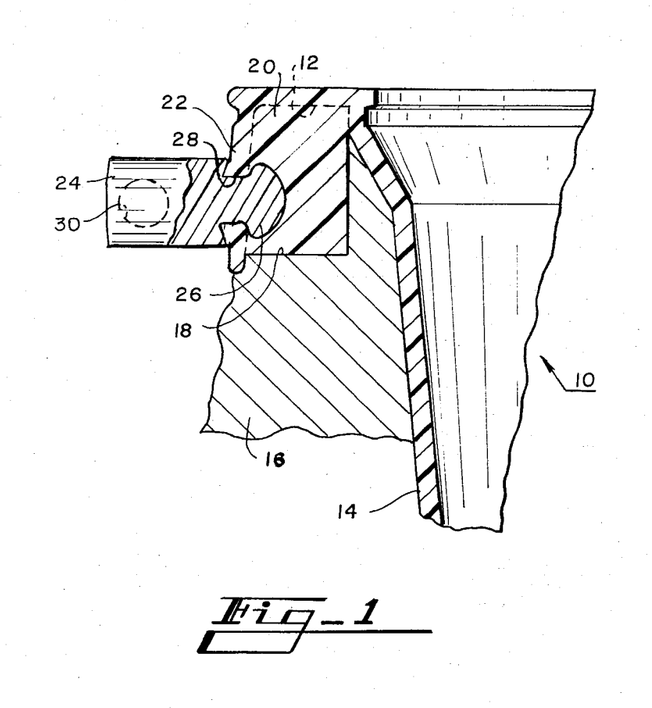
FIG. 1 represents a fragmentary side sectional view of a just-molded container and in paraticular the movable mold pin by which a socket is formed in the rim portion of the container.
Figure 2:
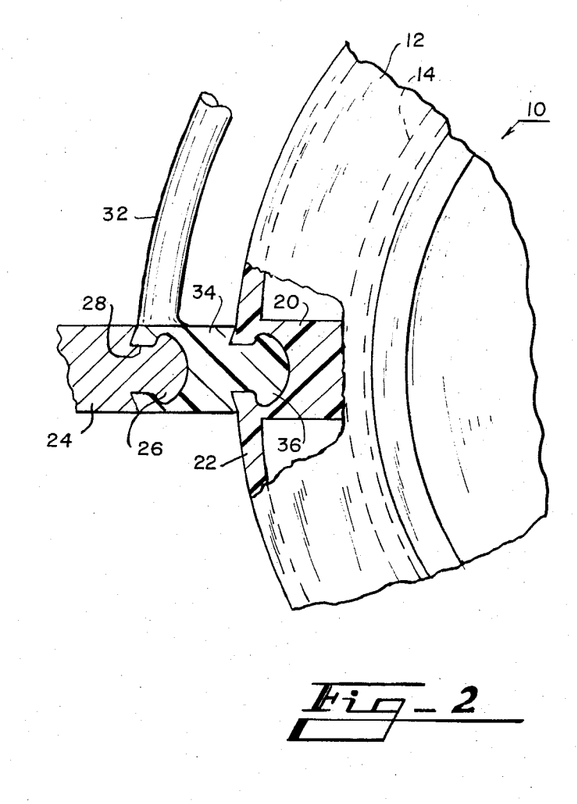
FIG. 2 represents a fragmentary, partly diagrammatic plan view showing the molded container of FIG. 1 and in section the movable mold pin moved to its second condition with the bail now molded with its end pivotally retained in the socket formed by the moved inner end of the movable pin.

DESCRIPTION OF THE PREFERRED EMBODIMENT OF FIGS. 1 and 2

Figure 8:
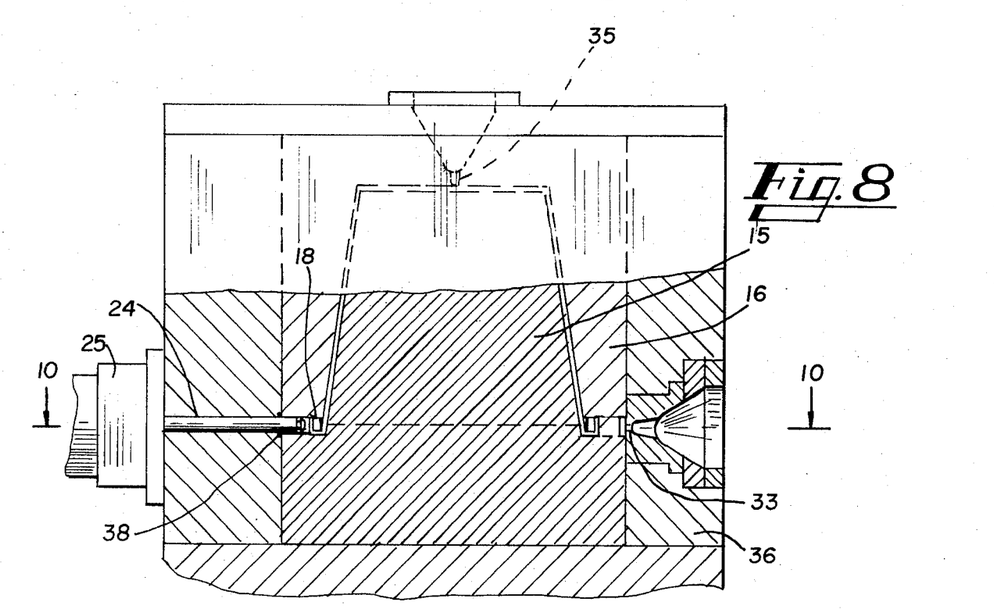
FIG. 8 represents a partly diagrammatic sectional view showing a mold arrangement whereby the container of the present invention may be molded, this view taken on the line 8—8 of FIG. 10 and looking in the direction of the arrows.

Referring now to the drawings and in particular to FIGS. 1 and 2 there is depicted a molded container 10 preferably having a reinforced outwardly extending rim portion 12 which is attached to a tapered side wall 14. An inner plug 15 as seen in FIG. 8, in combination with the female or outer portion 16 of the mold, when closed, provides the cavity into which the molten plastic for the container 10 is injected. Locally in the portion 16 is formed a recess portion 18 which, when filled, provides a block 20 of plastic. This block 20 extends inwardly from a downwardly extending skirt portion 22. The block may or may not extend to join the side wall 14 of the container, this being merely a matter of design selection.

Figure 9:
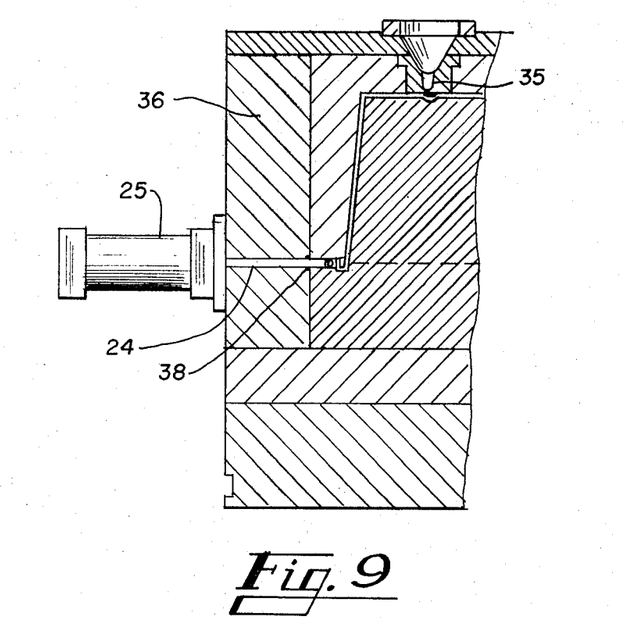
FIG. 9 represents in a slightly enlarged view the means for actuating a movable mold pin.

A pin member 24 is slidable mounted in the mold 16 and is selectively movable to three positions of movement by a hydraulic cylinder 25 as in FIGS. 8 and 9 or by a cam action. In its inner movement and limit the pin member 24 causes its inner end which is shown as an ellipsoid end 26 to be positioned inward of the inner edge of skirt 22. A reduced shoulder portion 28 in the pin is contemplated to be circular and concentric with the ellipsoid end 26. As shown, this reduced portion 28 in the pin produces a conical outwardly directed portion in the skirt 22. After the container 10 and the included block portion 20 are initially molded the pin 24 is moved outwardly to the position of FIG. 2. In doing this, a mold passageway 30, shown in dashed outline in FIG. 1, is uncovered. This passageway seen in plan view in FIGS. 10, 11 and 12 forms the bail-type handle cavity, shown.

Figures 10, 11, 12:
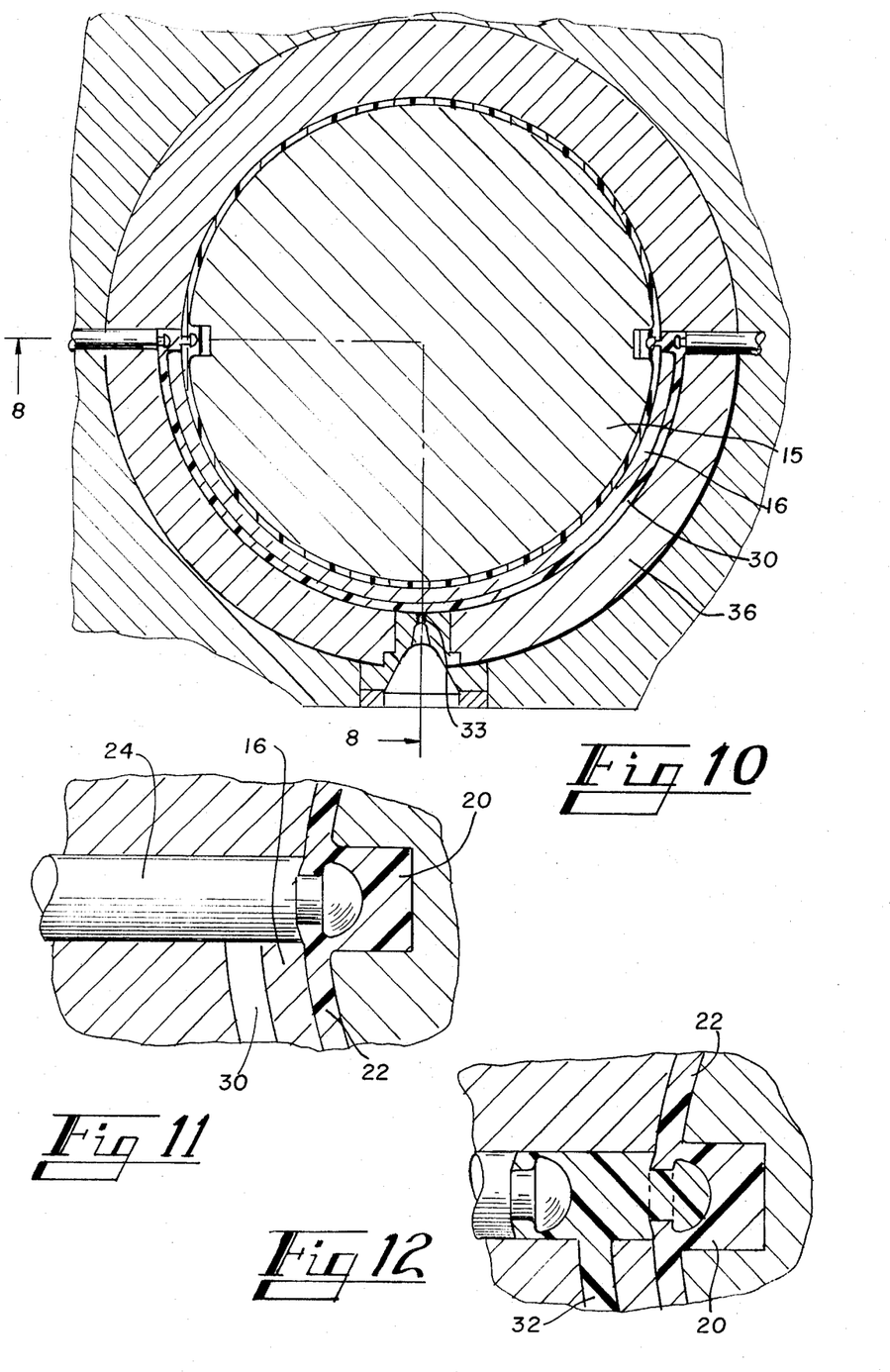
FIG. 10 represents a partly diagrammatic sectional plan view of the mold arrangement, this view taken on the line 10—10 of FIG. 8.
FIG. 11 represents a plan view of molded pivot of FIG. 1.
FIG. 12 represents a plan view of the molded pivot of FIG. 2.

With pin 24 now arranged in the mold 16 as in FIGS. 2, 10 and 12 and with the container 10 still in the mold, a plastic bail-type handle 32 of a different plastic is caused to flow in and through passageway 33 to the bail cavity 30. The ends of the bail flow through the terminal end of passageway 30 into that portion of mold 16 which has been evacuated by the outward movement of pin 24. This causes the bail-type handle 32 to have a heavy hub portion 34 which is of the size and configuration of pin 24 the hub having an inner ellipsoid end 36 which is formed in and by the cavity created by the outward withdrawal of pin 24. As a selected aesthetic appearance the outer face of the hub end has an outwardly extending conical construction conforming to the shape of the reduced portion 28 in the pin 24. To insure that the hub end 36 is not welded or otherwise attached to the cavity of plastic in which it is received it is contemplated that the material from which the molded container is made is not compatible with the plastic from which the bail-type handle is made. Prior to ejection of the container and attached handle, the pin 24 is further moved outwardly to its outer third position whereat the end 26 is removed from the molded bail hub 34. This, of course, leaves a corresponding recess in the hub 34 which may or may not be covered or filled by an auxiliary decorative piece not necessarily a part of this molding operation. If desired, a covering plug to partly fill the recess in the end of hub 34 may be molded as an attached part of handle 32. The appearance and shape of the hub and its outer facing end portion is merely a matter of selection.

As seen in FIGS. 8, 9 and 10 a container 10 is conventionally molded so that the molten plastic is fed through a sprue 35 into the bottom of the container. The bail handles of FIGS. 2, 4 and 6 must be molded so that their mid-thickness is more-or-less on the parting line between the inner plug 15 and the female outer portion 16. An outer chase portion 39 may be provided and in this chase is carried a side sprue 38 into which the injection nozzle of the second molten plastic source is fitted. The short sprue 33 is severed as the bail handle and the container are pushed by ejector pins from the core or inner plug 15. A sealing means such as an O-ring 38 may be used to prevent any flow of plastic up the passageway provided for pin member 24.

USE AND OPERATION

Although FIGS. 1 and 2 show only one side of the container 10 and a portion of the pivoted bail-like handle 32 it is, of course, to be realized that in a complete container 10 there are two like or similar sockets formed by like or similar pins 24. These pins and the corresponding sockets are diametrically disposed on the container 10 and the mold 16 as seen in FIG. 10. The bail-like handle 32 is pivotally secured at both its ends in these sockets.

It is contemplated that when the container 10 is molded the mold will be closed and pins 24 will be in the position of FIG. 1. Through sprue 35 connecting to the container cavity the molten plastic is fed and at this time block portion 20 and the ellipsoid button-like end 26 in this block form the receiving socket for the bail-type handle 32.

With the mold still closed and the molded container therein the pins 24 are moved outwardly from their inner position of FIG. 1 to the position of FIG. 2. The uncovering of mold passageway 30 and the rest of the bail-like handle cavity permits the bail 32 to be molded. This handle cavity is fed molten plastic preferably of another type and from another source and through sprue 33. The solidifying of the plastic providing this bail-type handle in the mold permits the pins 24 to be further moved outwardly to release the bail from the pins. After the removal of the pins from hub portion 34 the mold is opened as to both pail and attached bail-like handle and this assembled container is removed from the mold.

It is to be noted that pin 24 may be round or have other cross-sectional configurations. The ellipsoid shape of end 26 need not be provided but may be also spherical or any other shape which permits rotational movement of the bail end in the molded socket. The block 20 which forms a socket housing may be of any configuration which provides the desired support and thickness for forming the socket. The shrinkage developed in molding the block 20 in relation to the rim wall portion of the container and also the container side wall may require some allowances to be accommodated depending on the material from which the container is made and the relative sizes of the parts of the container and bail.

Although it is anticipated that the preferred container for which the molded bail will be used is an injection molded container, that is not to say that the container 10 may not be a blow molded container which is shaped in a mold having the female portions provided with movable pins 24. Around the ends of pins 24 the sockets may be formed and then in the manner above-described, the pins 24 are moved to enable the bail 32 to be molded with the handle ends 34 secured in these sockets.

The bail cavity 30 and bail 32 seen in FIGS. 8 through 12 are shown one hundred eighty degrees from that shown in FIGS. 1 and 2 but this showing is merely to indicate that the bail may be molded in either half of the mold with the sprue 33 arranged to accommodate the additional injection molding source which is opposite the discharge chute of the molding press.

Figure 3:
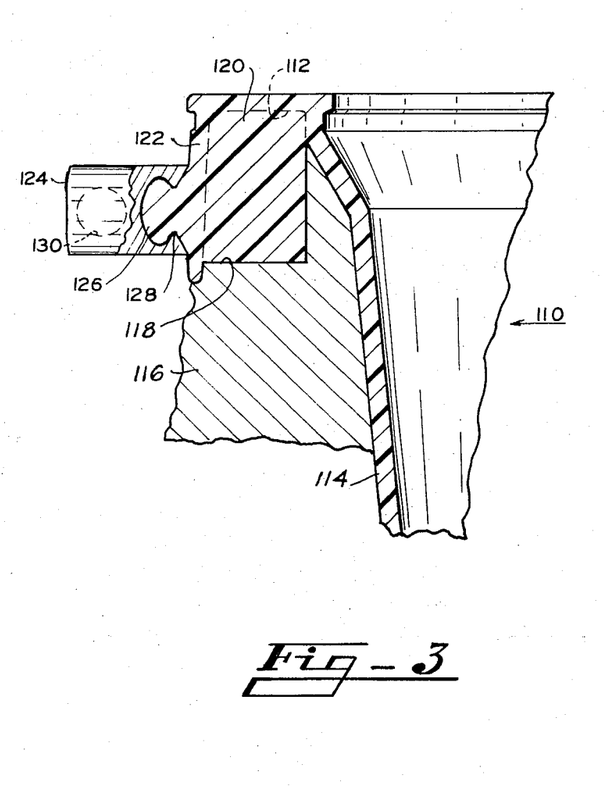
FIG. 3 represents a fragmentary side sectional view of an alternate just-molded container and in particular the relationship of the container to the movable mold pin by which this container is provided with a pair of button-like protuberances.
Figure 4:
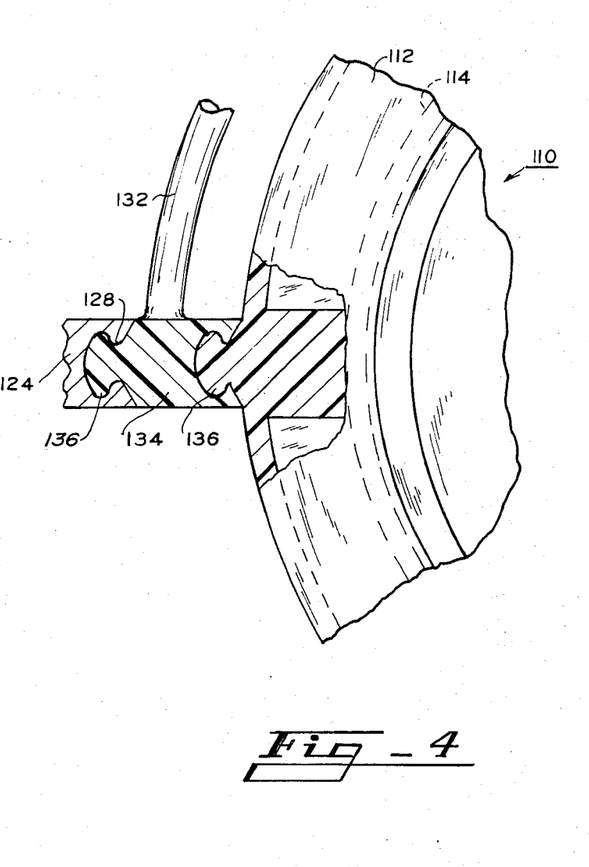
FIG. 4 represents a fragmentary, partly diagrammatic, plan view showing the molded container of FIG. 3 and in section the movable mold pin moved to its second condition with the bail now molded and with its end pivotally retained on the button-like protuberance formed by the moved inner end of the movable pin.

DESCRIPTION OF THE ALTERNATE EMBODIMENT OF FIGS. 3 and 4

Referring now to the drawings and FIGS. 3 and 4 there is depicted an alternate to the molded container 10. This alternate container 110 preferably has a reinforced outwardly extending rim portion 112 which is attached to a tapered side wall 114. An inner plug 15, as seen in FIG. 8 in combination with the female or outer portion 116 of the mold, when closed, provides the cavity into which the molten plastic for the container 110 is injected. Locally in the portion 116 is formed a recess portion 118, which when filled provides a block 120 of plastic. This block 120 extends inwardly from a downwardly extending skirt portion 122. This block, in the manner of the block 20 of FIG. 1, may or may not extend to join the side wall 114 of the container, this being merely a matter of design selection.

A pin member 124 is slidably mounted in the mold 116 and by means, such as seen in FIGS. 8 and 9, is movable to three positions of movement. In its inner movement and limit the pin member 124 causes its inner end to be positioned inward of the inner edge of skirt 122. This inner end is shown as having formed therein an ellipsoid-shaped or button-like cavity 126. A reduced shoulder portion 128 in the pin is contemplated to be circular and concentric with the button-like cavity 126. After the container 110 and the included block portion 120 are intially molded the means provided to move the pin 124 outwardly to the position of FIG. 4 is actuated. In doing this a mold passageway 130, shown in dashed outlined in FIG. 3, is uncovered. This passageway is the termination of a bail-type handle cavity 130, as seen in FIG. 13.

Figure 13:
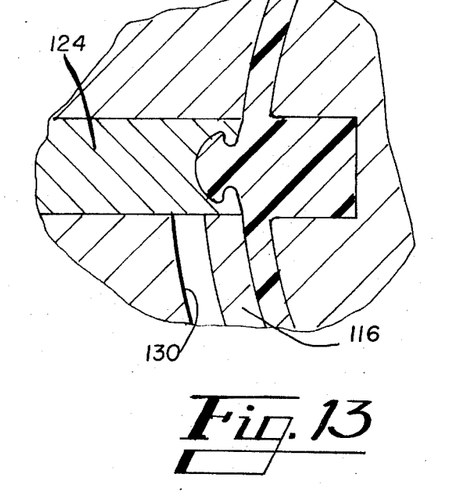
FIG. 13 represents a plan view of the molded pivot FIG. 3.

With pin 124 now arranged in the mold 116 as in FIGS. 4 and 13 and with the container 110 still in the mold, a plastic bail-type handle 132 of a different plastic from sprue 33 is formed when molden plastic is caused to flow into the bail cavity 130. The ends of the bail continue as a molten flow from cavity 130 and into that portion of mold 116 which has been evacuated by the outward movement of pin 124. This causes the bail-type handle 132 to have a heavy hub portion 134 which is of the size and configuration of pin 124 and encloses the button-like protuberant end 136 which is formed in the cavity 126 in the pin. The button-like protuberant end 136 is uncovered by the outward withdrawal of pin 124. To insure that the end 134 of the bail 132 is not welded or otherwise attached to the protuberant end 136 of plastic around which it is flowed, it is contemplated that the material from which the molded container 110 is made is not compatible with the plastic from which the bail-type handle 132 is made. Prior to ejection of the container and attached handle, the pin 124 is further moved outwardly to its outer third position which uncovers the protuberant end 136 of the bail hub 134. This, of course, leaves a button-like end 136 on the hub 134 which may or may not be covered by an auxiliary decorative piece not necessarily a part of this molding operation. If desired, this button-like protuberant end 136 may be removed by a secondary operation.

USE AND OPERATION OF THE CONTAINER AND BAIL OF FIGS. 3 and 4

Although FIGS. 3 and 4 show only one side of the container 110 and a portion of the pivoted bail-like handle 132 it is, of course, to be realized that as in FIG. 8 a complete container 110 are two like or similar protuberant ends 136 formed by like or similar pins 124.

These pins and the corresponding button-like protuberant ends 136 has diametrically disposed on the container 110 and the mold 116. The bail-like handle 132 is pivotally secured at both its ends on these protuberant ends 136.

Figure 14:
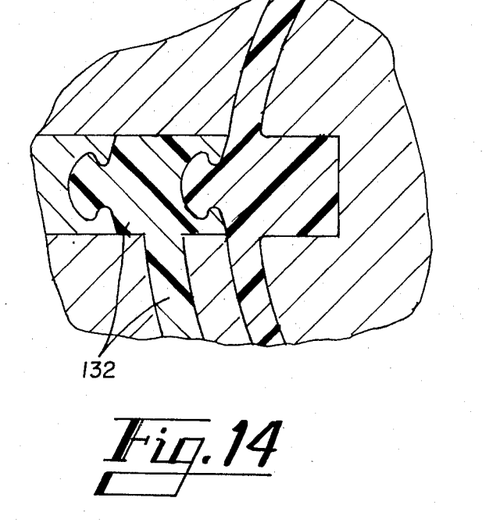
FIG. 14 represents a plan view of the molded pivot FIG. 4.

It is contemplated that when the container 110 is molded, the mold will be closed and pins 124 will be in the position of FIG. 3. Through sprue 35 to the container cavity the molten plastic is fed to this cavity and at this time block portion 120 and the cavity in pin 124 form protuberant ends 136 on the block 120 to provide the retaining attachment for the molded bail-type handle 132 as seen in FIG. 14.

With the mold still closed and the molded container therein the pins 124 are moved outwardly from their inner position of FIG. 3 to the position of FIG. 4. The uncovering of mold passageway 130 and the rest of the bail-like handle cavity permits the bail 132 to be molded with plastic from sprue 33. This handle is of molten plastic preferably of another type. The solidifying of the plastic providing this bail-type handle in the mold permits the pins 124 to be further moved outwardly to release the bail from the pins. After the removal of the pins from hub portion 134 the mold is opened as to both container 110 and attached bail-like handle 132 and this assembled container is removed from the mold.

It is to be noted that pin 124 may be round or have other cross-sectional configurations. The ellipsoid shape of end 136 need not be provided but may be also spherical or any other shape which permits rotational movement of the bail end around the end 136. The block 120 which forms the support for protuberant ends 136 may be of any configuration which provides the desired support and thickness for supporting the end 136.

As with the container of FIGS. 1 and 2, the container of FIGS. 3 and 4 is preferably an injected molded container, however, a blow molded container may be formed in the mold 116. Pins 124 may be used to form the outwardly extending button-like protuberant attachments 136. Around these attachment ends 136 the ends of the bail 132 are molded as above-described.

Figure 5:
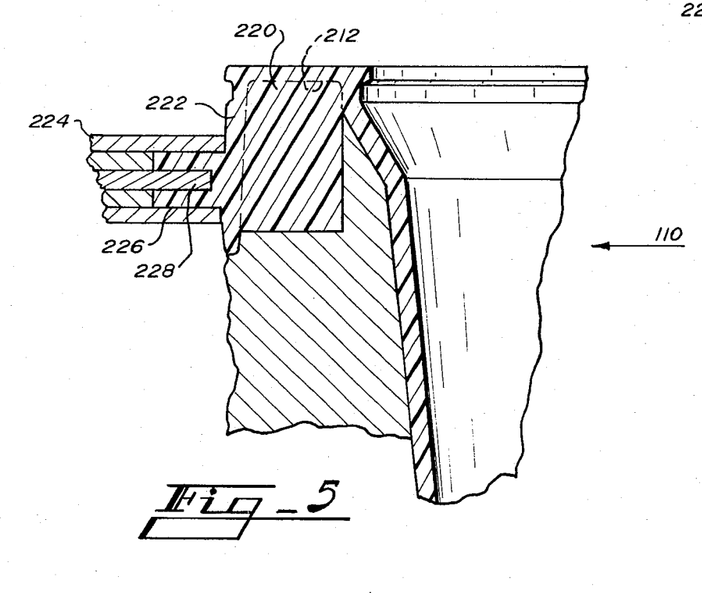
FIG. 5 represents a fragmentary side sectional view of an alternate just-molded container and in particular the relationship of the container to the movable mold pin by which this container is provided with a pair of pin-like protuberant attachments.
Figure 6:
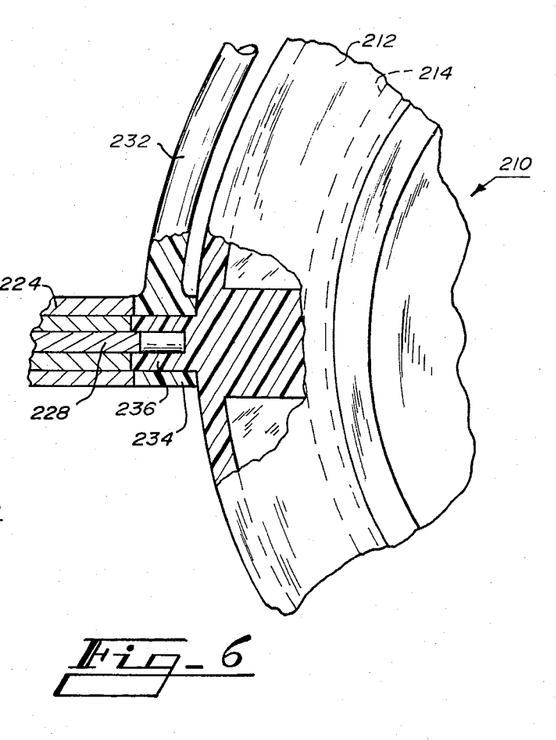
FIG. 6 represents a fragmentary partly-diagrammatic plan view showing the molded container of FIG. 5 and in section the movable mold pin moved to its second condition with the bail now molded, the shrinkage of the central portion of the hollow pin-like protuberant attachment providing a reduced diameter for retaining the strap-like end of the bail.
Figure 7:
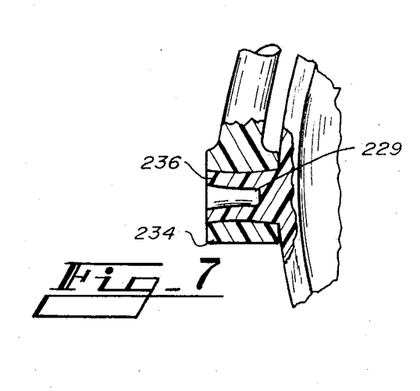
FIG. 7 represents a fragmentary enlarged sectional view of the bail end mounted on the pin-like protuberant attachment as formed on the container.

DESCRIPTION OF THE ALTERNATE EMBODIMENT OF FIGS. 5, 6 and 7

Referring next to the drawings and FIGS. 5, 6 and 7 there is depicted an alternate to the molded container 110 of FIGS. 3 and 4. This alternate container 210 preferably has a reinforced outwardly extending rim portion 212 which is attached to a tapered side wall 214. An inner plug, as in FIG. 8, in combination with the female or outer portion 216 of the mold, when closed, provides the cavity into which the molten plastic for the container 210 is injected. Locally in the portion 216 is formed a recess portion 218 which, when filled, provides a block 220 of plastic. This block 220 extends inwardly from a downwardly extending skirt portion 222. This block, which corresponds to the block 20 of FIG. 1, may or may not extend to join the side wall 214 of the container, this being merely a matter of design selection.

Figure 15:
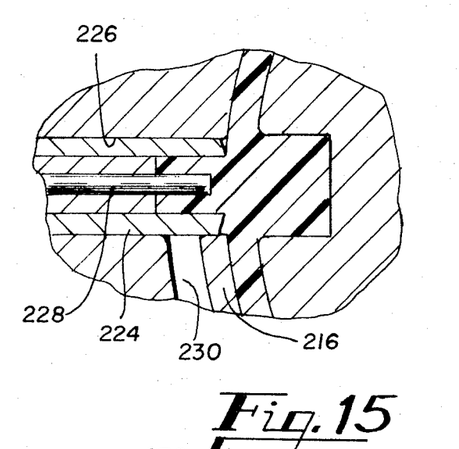
FIG. 15 represents a plan view of the molded pivot of FIG. 5.

A pin member 224 is slidably mounted in the mold 216 and by means, such as cylinder 25 in FIGS. 8 and 9, is movable to three positions of movement. In this inner movement and limit the pin member 224 causes its inner end to be positioned at or slightly outward of the inner edge of skirt 222. This inner end is shown as having formed therein a straight bore 226 which is of a determined depth for the molding of a pin-like protuberant attachment 236 which extends outwardly of the block 220. A smaller pin portion 228 is slidably carried in the bore 226 and when the pin 224 is in its inner position the pin 224 causes a circular recess 229 to be formed in the protuberant attachment 236. After the container 210 and the including block portion 220 are initially molded the means provided to move the pin 224 outwardly to the position of FIG. 6 is actuated. In doing this a mold passageway 230, shown in dashed outline in FIG. 5 and in plan view in FIG. 15, is uncovered. This passageway is a portion of the bail-type handle cavity, such as shown in FIG. 10.

Figure 16:
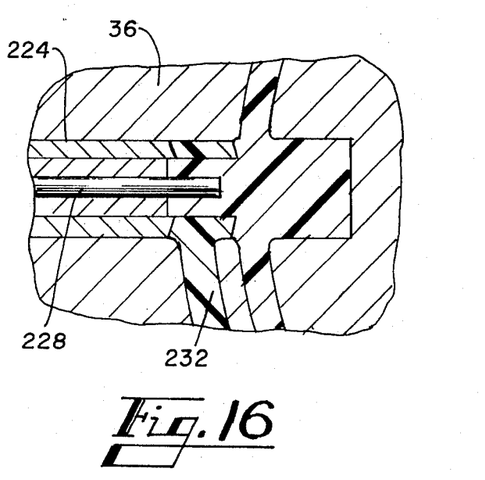
FIG. 16 represents a plan view of the molded pivot of FIG. 6.
Figure 17:
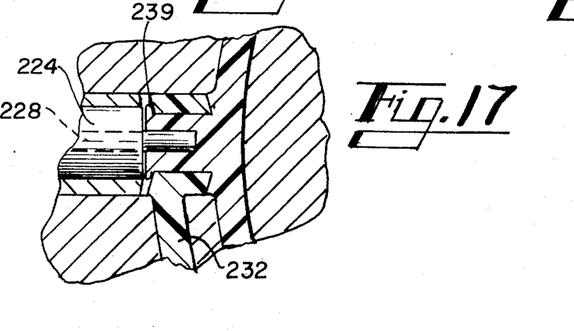
FIG. 17 represents a plan view of the molded pivot of FIG. 7.

With pin 224 now arranged in the mold 216 as in FIGS. 6 and 16 and with the container 210 still in the mold, a plastic bail-type handle 232 of a different plastic is caused to flow in the bail cavity. The flow of molten plastic forming the bail through passageway 230 continues into that portion of mold 216 which has been evacuated by the outward movement of pin 224. This causes the bail-type handle 232 to form a heavy strap-like loop end 234 which is of the outer size and shape of pin 224 and encloses the pin-like protuberant end 236. As the pin-like protuberant end 236 is uncovered by the outward withdrawal of pin 224 the pin 228 is moved only a portion the distance so that pin 228 remains in and closes the outer end of the recess 229 during molding of the bail. To insure that the bail is not welded or otherwise attached to the protuberant end 236 of plastic around which it is flowed, it is comtemplated that the material from which the molded container 210 is made is not compatible with the plastic from which the bail-type handle 232 is made. Prior to ejection of the container and attached handle, the pin 224 and retained smaller pin 228 are further moved outwardly to their outer third position which disengages the pin 228 from pin-like end 226. This, of course, leave a small recess 229 in member 226 which may or may not be covered by an auxiliary decorative piece not necessarily a part of this molding operation. As seen in FIG. 17, after the bail 232 has been molded and while still relatively soft, the pin portion 224 may be pushed inwardly slightly to cause an upsetting of the end 236 and a rivet portion 239 to be formed. An expansion of the recess may also be made by auxiliary means with the resulting configuration of FIG. 7.

USE AND OPERATION OF THE CONTAINER AND BAIL OF FIGS. 5, 6 and 7

Although FIGS. 5 and 6 show only one side of the container 210 and a portion of the pivoted bail-like handle 232 it is, of course, to be realized that as in FIG. 8 there is provided a complete container 210 having two like or similar protuberant ends 226 formed by like or similar pins 224. These pins and the corresponding pin-like protuberant ends are diametrically disposed on the container 210 and the mold 216. The bail-like handle 232 is pivotally secured at both its ends on these protuberant ends 226.

It is contemplated that when the pail 210 is molded, the mold will be closed and pins 224 will be in the position of FIG. 5. Through sprue 35 leading to the container cavity the molten plastic is fed and at this time block portion 220 and the cavity in pin 224 form protuberant end 236 on the block 220 to form the pin-like attachment for the molded bail-type handle 232.

With the mold still closed and the molded container therein the pins 224 are moved outwardly from their inner position of FIG. 5 to the position of FIGS. 6 and 16. The pin 228 is moved outwardly less than the travel of pin 224 so that the end of pin 228 still remains in the recess 229 to the extend it plugs the end of the recess. The uncovering of mold passageway 230 and the rest of the bail-like handle cavity permits the bail to be molded. This handle cavity is fed molten plastic preferably of another type and from another source and through sprue 33, as shown in FIG. 8. The solidifying of the plastic providing this bail-type handle in the mold permits the pins 224 to be further moved outwardly to release the bail from the pins. After the removal of the pins from hub portion 234 the mold is opened as to both container and attached bail-like handle and this assembled container is removed from the mold.

In addition to the riveting action shown in FIG. 17 it is contemplated that an alternate securing method might include the forming of the bail end 234 around the pin 236 the recess 229 may have its outside plugged and supported by the incompletely removed pin 228. The heat from the molten mass then causes a small collapse of the pin 236 toward the recess so that as in FIG. 7 the result is a slightly concave journal of the pin member 236 and although this is only a few thousandths of an inch it is sufficient to rotatably retain the end 234 on the pin-like extension 236.

If desired, a cap piece may be inserted in the recess 229 to cover this recess. Other means may be used to form a retaining means on pin 236. As noted in the embodiments of FIGS. 1 and 3, this embodiment of FIG. 5 may use a blow molded container to which is attached the molded bail handle.

In defining the several mold components and the resulting molded product it is to be noted that: (a) the container need not have an outwardly extending rim and even if one is provided the socket recesses form the local block portions molded as part of and extending outwardly from the side wall. (b) In FIG. 1 the inner end 26 of the movable pin 24 is enlarged from the reduced diameter 28 by whatever amount can be withdrawn through the just formed outer wall of the socket. This inner end 26, no matter its shape, has its outer surface concentric to the axis of rotation of hub 34 of the bail 32. (c) In FIG. 1 the shape of the connection portion 32 of the hub 34 of the bail-type handle is merely a matter of selection with the strength of the bail-type handle being sufficient to accept the expected load.

In the alternate embodiment depicted in FIGS. 3 and 4 the formed protuberant end 136 has its larger shape adapted to be withdrawn from the outwardly moved pin 124. This formed end 136, no matter what its shape may be, provides a concentric form around which the hub 134 is molded. As in FIG. 1, the protuberance 136 and hub 134 are designed with the strength of the plastic material and load on the handle as the factors establishing the final configuration.

In the alternate embodiment as shown in FIGS. 5, 6 and 7, the protuberant end 236 is formed as a straight short pin which extends outwardly to provide the extension around which hub end is molded. This strap-like mounting provides only rotational motion of the hub around the pin extension.

Terms such as "left", "right", "up", "down", "bottom", "top", "front", "back", "in", "out" and the like are applicable to the embodiments shown and described in conjunction with the drawings. These terms are merely for the purpose of description and do not necessarily apply to the position in which the mold and bailed plastic container formed thereby may be constructed or used.

While a particular embodiment of the mold and container and an alternate embodiment thereof have been shown and described it is to be understood the construction and method of use is not limited thereto and protection is sought to the broadest extent the prior art allows.

I claim:

1. Apparatus for molding a container and bail-type handle whose ends are molded around mating portions formed on the exterior surface of said container to provide a rotatably secured attachedment of the handle to the container, said apparatus including: (a) a mold having complementary male and female components which when closed provide a cavity for the molding therein of a container; (b) a pair of locally positioned and shaped recesses positioned and shaped so that as the container is molded there is provided a pair of diametrically opposed portions integrally attached to the outer portion of the container; (c) a pair of movable pins carried in the female mold portion with each pin adapted for movement in a guideway for said pin provided in the mold and in this guideway moving the inner end of the pin toward, into and from one of said shaped recesses, each of said pins having its inner end formed to provide a fixed member of a molded-in-place rotatable connection and with said fixed member an integral portion of the container; (d) means for moving each of the pins to a fixed position so that the inner end of the pin is positioned within the locally positioned recess and as and when the container is molded of plastic this plastic material flows into the shaped recess and around the end of the pin to form a bail handle securing portion which is integrally attached to the container; (e) means for moving each of the pins after the container is molded, the extent of travel of each pin being sufficient to uncover the bail-handle connection portion of the container cavity and with its outward travel to an intermediate stop position to form a hub cavity; (f) a bail-type handle cavity formed in the mold, the ends of this handle cavity being open and providing a passageway into the hub cavity area evacuated by the moved pin, this movement of each of the pins uncovering said passageway from the handle portion to and into the hub cavity and recess, each moved pin at its stopped intermediate position with its inner end providing an outer wall closing of the handle hub cavity; (g) means for injecting from a separate source of plastic and through its own sprue a quantity of molten plastic into the handle cavity to form the handle and connected hub ends, said plastic as it flows to and around the bail-handle connecting portion carried by the block-like member on the plastic container forming a pivoted connection as and while said molded container is retained in the mold; (h) means for moving the pins outwardly to a further condition to release the inner end of the pins from engagement with the just formed handle and hub attachment while the container and attached handle is still in the mold, and (i) means for opening the mold and for removing from said mold the container and rotatably secured and retained handle.

2. Apparatus for molding a container and handle as in claim 1 in which each of the ends of said pin is shaped to form a socket in the block-like member, each of said pins having its inner end formed with a reduced diameter portion established at a determined distance from the distal end of the inner end, each inner end being increased in size at least in portions thereof from the reduced diameter portion of said inner end, the inner end being shaped so that any cross section normal to the axis of the inner end has its outer surfaces substantially circular in configuration.

3. Apparatus for molding a container and handle as in claim 1 in which the mold is formed to provide an outwardly extending rim and the locally positioned recesses are shaped and positioned to provide block-like members attached to an outer skirt portion of the rim.

4. Apparatus for molding a container and handle as in claim 3 in which the end of the pin is formed with a reduced diameter portion established at a determined distance from the distal end of the inner end, each inner end being increased in size and shaped so that a socket which is ellipsoid in shape is formed in the block member during molding of the container.

5. Apparatus for molding a container and handle as in claim 3 in which the reduced diameter portion of the movable pin is positioned to coincide with the outer skirt when and while the molded socket is being formed in a block-like portion.

6. Apparatus for molding a container and handle as in claim 1 in which the movable pin has a reduced diameter portion positioned to coincide with the outer skirt when and while a molded protuberant pin-like connection is being formed on a block-like portion of the container.

7. Apparatus for molding a container and handle as in claim 1 in which the movable pin when moved outwardly to the intermediate position in which the handle is molded, evacuates an inner portion of the pin guideway said guideway sized so that an enlarged hub portion of the bail-type handle is formed on each end of the handle.

8. Apparatus for molding a container and handle as in claim 7 in which the axis of rotation of both hubs of the handle is substantially a coinciding axis.

9. Apparatus for molding a container and handle as in claim 1 in which the distal end of the inner end of the pin is formed with a reduced diameter aperture which extends inwardly to a larger button-like cavity which provides a resulting button-like molded protuberance attached to and extending outwardly from a block-like member formed on teh outer wall of the container.

10. Apparatus for molding a container and handle as in claim 9 in which the movable pin when moved is moved outwardly to position two, whereat the handle is molded and in moving the pin evacuates a portion of the pin guideway, said guideway sized so that an enlarged hub portion of the bail-type handle is formed at both ends of the handle.

11. Apparatus for molding a container and handle as in claim 10 in which the axis of rotation of both hubs of the handle is substantially a coinciding axis.

12. Apparatus for molding a container and handle as in claim 1 in which each of the ends of said movable pins is formed with a cylindrical recess which as the container is formed causes the fixed member to be formed as a straight-pin extension which is attached to and extends outwardly from a block-like member formed on the outer wall of the container.

13. Apparatus for molding a container and handle as in claim 12 in which each of the movable pins is provided with a second and smaller pin which extends into the cylindrical recess so that the molded straight-pin extension is formed with an axial recess extending from the outer end of said pin extension for a determined distance inwardly.

14. Apparatus for molding a container and handle as in claim 13 in which the second smaller pin is movably retained within a larger movable pin assembly and there is provided means for moving said smaller pin from its maximum penetration into the cylindrical recess during the forming of the straight-pin extension and while and when a larger movable sleeve portion of the assembly is moved to its second position for molding the bail-type handle said smaller pin is moved a lesser extent so that this smaller pin closes the opening into the axial recess of the straight-pin extension during the molding of the bail-type handle.

15. Apparatus for molding a container and handle as in claim 14 in which the second smaller pin is moved outwardly with the movable pin assembly so as to be disengaged from the straight-pin extension while and as the mold is opened for removal of the container and secured handle.

* * * * *